United States Patent [19]

Smith

[11] Patent Number: 5,425,197

[45] Date of Patent: Jun. 20, 1995

[54] DEVICE FOR TRAPPING FLYING INSECTS

[75] Inventor: Colin P. Smith, Ashurst Wood, Great Britain

[73] Assignee: Rentokil Limited, United Kingdom

[21] Appl. No.: 142,299

[22] PCT Filed: May 20, 1992

[86] PCT No.: PCT/GB92/00911

§ 371 Date: Nov. 17, 1993

§ 102(e) Date: Nov. 17, 1993

[87] PCT Pub. No.: WO92/20224

PCT Pub. Date: Nov. 6, 1992

[30] Foreign Application Priority Data

May 24, 1991 [GB] United Kingdom ............... 9111239

[51] Int. Cl.⁶ .......................... A01M 1/04; A01M 1/14
[52] U.S. Cl. .......................................... 43/113; 43/114
[58] Field of Search ................. 43/113, 114, 111, 115

[56] References Cited

U.S. PATENT DOCUMENTS

| 1,577,148 | 3/1926 | Pical | 43/111 |
|---|---|---|---|
| 1,622,591 | 3/1927 | Killion | 43/115 |
| 3,023,539 | 5/1972 | Emerson | 43/113 |
| 3,816,956 | 6/1974 | Sekula | 43/114 |
| 3,956,848 | 5/1976 | Job | 43/115 |
| 4,052,811 | 10/1977 | Shuster | 43/136 |
| 4,117,624 | 10/1978 | Phillips | 43/113 |
| 4,127,961 | 12/1978 | Phillips | 43/139 |
| 4,425,733 | 1/1984 | Ammon et al. | 43/114 X |
| 4,985,302 | 1/1991 | Zucchiatti | 428/343 |

FOREIGN PATENT DOCUMENTS

| 530908 | 4/1980 | Australia . |
|---|---|---|
| 2610191 | 9/1977 | Denmark . |
| 3511215 | 10/1986 | Denmark . |
| 3810065 | 4/1989 | Denmark . |
| 3840440 | 10/1989 | Denmark . |
| 0213369 | 3/1987 | European Pat. Off. . |
| 0369976 | 5/1990 | European Pat. Off. . |
| 8704469 U | 9/1987 | Germany . |
| 161335 | 6/1991 | Taiwan, Prov. of China . |
| 503943 | 7/1937 | United Kingdom . |
| 1303109 | 4/1987 | U.S.S.R. . |

Primary Examiner—Mark Rosenbaum
Assistant Examiner—Jeanne M. Elpel
Attorney, Agent, or Firm—Silverman, Cass & Singer, Ltd.

[57] ABSTRACT

A device for controlling pests, especially flying insects, which comprises an attractant radiation source (44) and a substrate (61) having an adhesive surface illuminated by the radiation. The surface is advanced continuously or intermittently from storage space, so as to avoid a build up of trapped insects.

17 Claims, 5 Drawing Sheets

DEVICE FOR TRAPPING FLYING INSECTS

This invention relates to a device for trapping flying insects and similar small pests, more especially to such a device having an attractant radiation source and an adhesive surface.

A device having a sticky trapping surface and a light source is described in DE-OS 2610191. In that device, the trapping surface may either be the surface of a plate of transparent material, one edge of the plate being illuminated by the light source, or it may be the outer surface of a hollow cylinder of transparent material with the light source positioned within it.

Another trap having a light source and an adhesive surface is described in U.S. Pat. No. 4117624. That device comprises an ultraviolet light source partially surrounded by a detachable reflector-holder, in which may be positioned a disposable reflector having a sticky reflective surface. The reflector holder is detachable from the device and, when it is detached, the adhesive reflector may be replaced without contacting it directly, for example, by pushing it from the holder with a new reflector.

Another device incorporating replaceable reflectors and a ultraviolet light source is described in DE-PS 3810065, the light source in that device being mounted on a hinge so that it may be swung away from the reflector to facilitate the replacement of an old reflector by a new one.

Such insect traps have been proposed as alternatives to the commonly used devices incorporating combinations of ultraviolet-light attractants and high voltage grids because of the disadvantages inherent in the latter. These include the danger to domestic animals, which necessitates the placement of the devices in elevated locations that in turn renders servicing difficult, and the unpleasant noises and smells when insects hit the grids, together with a risk of contamination in, for example, food processing areas, caused by the break up of insects. Furthermore, very small insects, for example, fruit flies, often pass safely through the grid, and the device is therefore largely ineffective against such insects.

Previously proposed devices having light sources and adhesive surfaces have, however, themselves suffered various disadvantages. One such disadvantage is the adverse effect of ultraviolet light on the adhesive. When the light is from a ultraviolet source emitting radiation of a wavelength in the region of 315 to 430 nm, especially about 360 nm (a range that has proved most effective in attracting insects), it is found that the adhesive, which must be tacky to be effective, is cured by such radiation and loses its tack after a relatively short period, so that the adhesive surface must then be replaced.

Further, although the devices described in U.S. Pat. No. 4117624 and DE-PS 3810065 mentioned above have been designed with a view to facilitating the replacement of the adhesive sheet, frequent replacement is necessary if an unpleasant appearance is to be avoided, and may still be a somewhat distasteful procedure.

There accordingly remains a need for an insect trapping device in which a fresh adhesive surface can readily be provided.

The present invention accordingly provides a device for trapping flying insects, which device comprises a substrate, first and second storage means for the substrate, a radiation source, and an exposure zone in which radiation emitted from the source is incident upon a portion of the substrate, the first storage means being arranged to store a supply of the substrate from which successive portions can be advanced to the exposure zone, the second storage means being arranged to store successive portions of the substrate withdrawn from the exposure zone, and the arrangement being such that radiation emitted from the source is reflected from the portion of the substrate in the exposure zone, and/or is transmitted through that portion, so as attract insects onto it, and at least a part of the surface area of that portion is adhesive so that insects attracted by the radiation adhere thereto, and wherein the device also comprises advancing means for drawing successive portions of the substrate from the first storage means to the exposure zone and withdrawing successive portions from the exposure zone to the second storage means, and control means arranged to so operate the advancing means that the substrate is advanced intermittently to an extent sufficient for a fresh portion of the substrate to occupy the exposure zone.

With the device of the invention, the substrate is advanced intermittently in order to present a fresh adhesive portion of the substrate in the exposure zone. For example, the control means may be arranged to cause the substrate to be advanced once every five days (although it may be found desirable to advance it more or less frequently, for example, every day or every ten days). The control means preferably includes an override to enable a user to advance the substrate, if desired, and such an override may conveniently be operable by remote control, for example, on receipt of an infra-red signal from a remote infra-red signalling device.

The advancing means for the substrate may comprise a motor, which may be a clockwork motor or an electric motor, and which may be arranged to drive the substrate directly or indirectly. Conveniently, for example, the motor may drive the supporting means of the second storage means to cause the substrate to wind onto that supporting means. The substrate may be positively advanced from the first storage means, for example, by direct or indirect drive, and, preferably, in such an arrangement, the substrate is also positively drawn into the second storage means. For this purpose, the two drives are advantageously linked, and driven by a single motor, as by a chain or belt drive.

The device of the invention can be so designed as to be safe to operate in humid conditions or in explosive areas where there might be a danger of ignition resulting from any sparking. The device accordingly has inherent advantages over the high voltage insect traps which are unsuitable for use in either explosive or humid atmospheres.

The first and second storage means and the substrate are advantageously formed as a unit, which is hereinafter referred to as a "cassette", the cassette being removable from the remainder of the device. With such an arrangement, when it is necessary or desired to replace the substrate, the cassette can be removed from the remainder of the device, which can be left in situ. The substrate may then be taken out from the storage means, a fresh substrate installed, and the cassette returned to the device. Alternatively, the entire cassette may be replaced by a similar cassette, which includes a fresh substrate. Either of those arrangements greatly facilitates the servicing of the device, especially when the device is located at an elevated position, which is often the case. The cassette may also include at least a portion of a housing that forms part of the first and second storage means.

For many applications, the device is advantageously provided with a translucent or transparent window arranged to transmit radiation from the source and having one or more openings through which insects can pass, the window being arranged adjacent to the portion of the substrate in the exposure zone. It is possible that such a window increases the attraction of the device to flying insects. It is also possible to arrange for insects flying through the said openings in the window almost immediately to encounter the substrate and adhere to it. Such a window has the advantage of serving to screen, at least partly, the portion of the substrate in the exposure zone from general view. The window is advantageously in the form of a louvred panel, and is preferably removable from the remainder of the device. When the device comprises a cassette, then the window preferably forms part of the cassette so that it can be removed from the remainder of the device when the cassette is removed. The window is advantageously made from ultraviolet-resistant acrylics material, which is preferably frosted on the side nearest to the substrate.

The source of radiation and the substrate can be so arranged that the portion of the substrate in the exposure zone reflects radiation from the source. In that arrangement, the substrate is advantageously in the form of a reflecting film or foil, for example, a thermoplastics or paper film having a metallized surface, for example, aluminium, or it may be in the form of a thin metal sheet, of, for example, aluminium or stainless steel. Also, at least one radiation source is advantageously provided adjacent to each lateral edge of the portion of the substrate in the exposure zone, spaced sufficiently forward of the substrate that the radiation is reflected into the airspace from which the flying insects are to be attracted. Alternatively, there may be a radiation source adjacent to one of the lateral edges of the substrate and a reflector adjacent to the other lateral edge. If there are two or more sources, they may emit radiation of different wavelengths. For example, one may emit infra-red radiation and another may emit ultraviolet radiation.

Alternatively, the source of radiation and the substrate can be so arranged that the portion of the substrate in the exposure zone transmits radiation emitted from the source. In that arrangement, the substrate may be in the form of a translucent film or a film having an array of apertures through which the radiation is transmitted, or it may be in the form of a web of woven material or netting. Advantageously, however, the substrate is in the form of a transparent plastics film, at least the portion of which in the exposure zone has, on one surface, a transparent adhesive composition, and the source of radiation is situated on the other side of the said portion from that having the adhesive surface. With that arrangement, if a lamp were to shatter, it is possible to prevent glass dropping from the device and possibly contaminating food beneath it.

The radiation source advantageously comprises one or more sources of ultraviolet radiation which, for example, emit radiation of wavelengths within the range of from 315 to 430 nm, more especially about 360 nm. A suitable source is a 15 watt tubular lamp, for example a Philips TLD 15W/09N tube.

When the substrate is in the form of a film or foil, one surface of the substrate is advantageously adhesive substantially throughout its length, although a zone or zones extending along the length of the substrate may be left free from adhesive to facilitate driving, or for other purposes, and a zone at the front end of the substrate may be left free to facilitate installation of the substrate. It is also within the scope of the invention, however, to arrange that an adhesive composition from an adhesive reservoir is applied to the substrate at a location between the first storage means and the exposure zone, and when the substrate is in the form of a web of woven material or netting such an arrangement is preferred.

The adhesive composition may be a viscous, non-drying. pressure-sensitive adhesive, for example, a polybutene based material, especially, a poly-n-butene/poly-iso-butene based material. The adhesive composition may contain one or more substances that attract insects, for example, pheromones. The substrate may alternatively or in addition be printed with an attractant pattern, for example, black dots or silhouettes of insects, for example, flies, which encourages the formation of a so-called "aggregation" of flying insects.

When one surface of the substrate is adhesive substantially throughout its length, the other surface of the substrate may be a release surface, which may be provided by a release coating on the said other side of the substrate. In another arrangement, a separate release sheet may be provided, which is arranged in contact with the adhesive surface of the substrate in the first storage means.

The device may be so arranged that insects adhering to the substrate are removed as the substrate is advanced to the second storage means. This may be achieved by mechanical means, for example, a blade located close to the substrate as it passes from the exposure zone, or a brush in contact with the substrate. Preferably, such a device is provided with collection means for the insects removed from the substrate, the collection means being arranged to retain the insects within the device. Alternatively or in addition, the substrate may be treated to remove the adhesive, for example, by solvent or other physicochemical treatment, any insects being removed at the same time. If desired, the substrate, whether merely cleaned of insects or treated to remove adhesive, may be recycled.

Advantageously, however, there is provided means for crushing insects adhering to the substrate, for example, a crusher bar arranged to press against the substrate as it passes to the second storage means, so as to flatten the insects onto the substrate. Such an arrangement has the advantage that the bodies of insects are held on the substrate, reducing the risk, which occurs especially when the bodies are removed from the substrate and collected in a container, that air movement will cause the bodies, which may be dehydrated, to fall from the device. Also, with that arrangement, when the substrate is removed from the device, it can be inspected to discover the species of insects being trapped by the device and the numbers of such insects.

Advantageously, the device comprises means for applying pheromones, or other substances that attract insects, to the substrate, or means for emitting such substances into the atmosphere immediately surrounding the substrate. The said means may comprise one or more pheromone sources arranged to contact the surface of the substrate as it is advanced from the first storage means, and for that purpose the sources may be provided with, for example, roller-ball applicators. Alternatively, the said means may comprise one or more pheromone sources, each of which is arranged to emit a plume of pheromones into the atmosphere immediately surrounding the substrate, and for that purpose the sources may be provided with porous filters, or the sources may be in the form of phials, each of which is designed to release a plume of a continuous stream of molecules. Thus, it is possible to select a pheromone or a combination of different pheromones depending on the insects that it is intended be trapped by the device. For example, in a cigarette factory, a cigarette beetle pheromone would be appropriate. An analysis of the insects adhering to the substrate, which can be made during the inspection referred to above, enables the appropriate pheromones to be selected. When the device comprises a cassette, one or more sources of pheromones are advantageously mounted in or on the cassette, so as to be removable for servicing with the cassette.

Conveniently, two devices according to the invention may be combined in a single unit, with their exposure zones facing in opposite directions.

Three forms of device constructed in accordance with the invention will now be described, by way of example, with reference to the accompanying drawings, in which.

Figure 1:
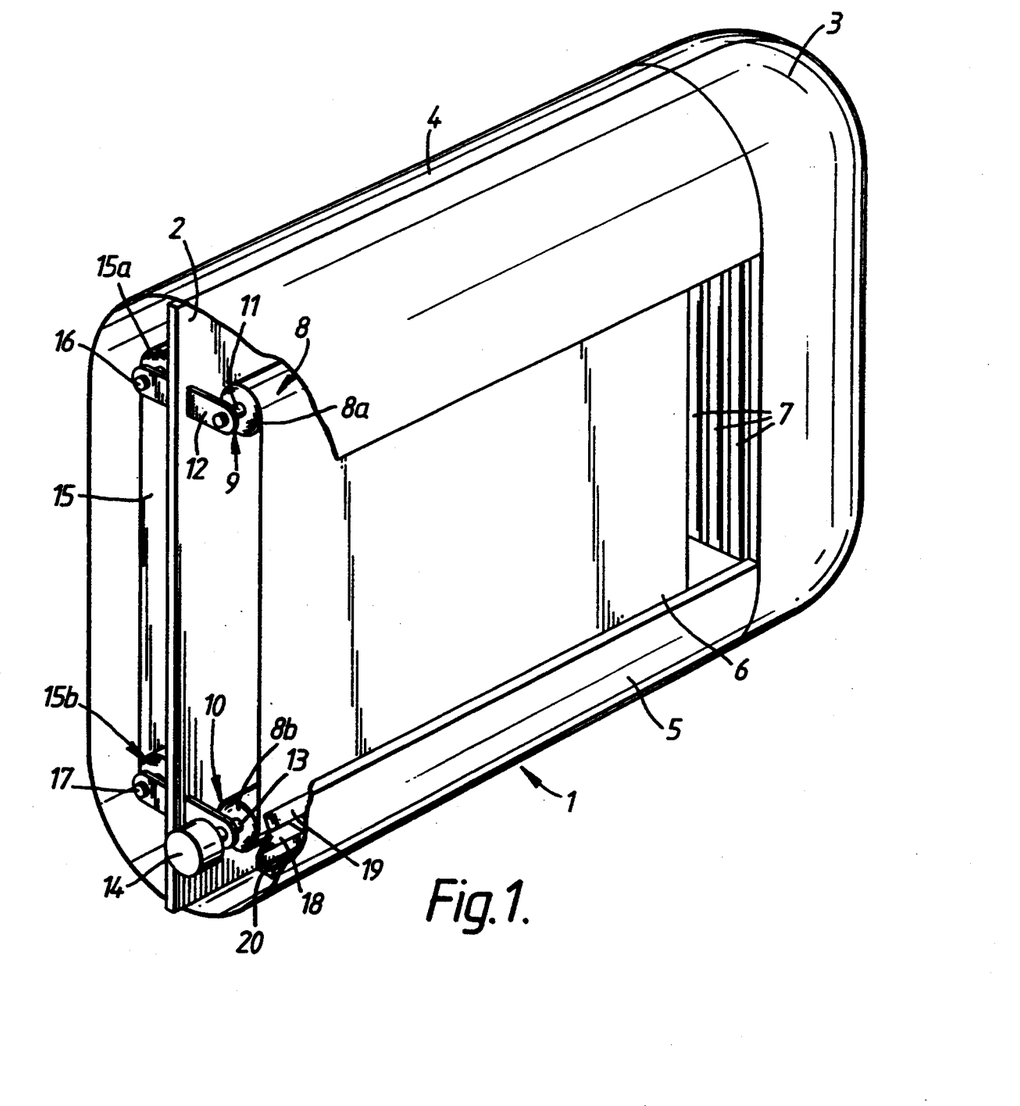
FIG. 1 is an isometric view, partly broken away, of the first form of the device.
Figure 2:
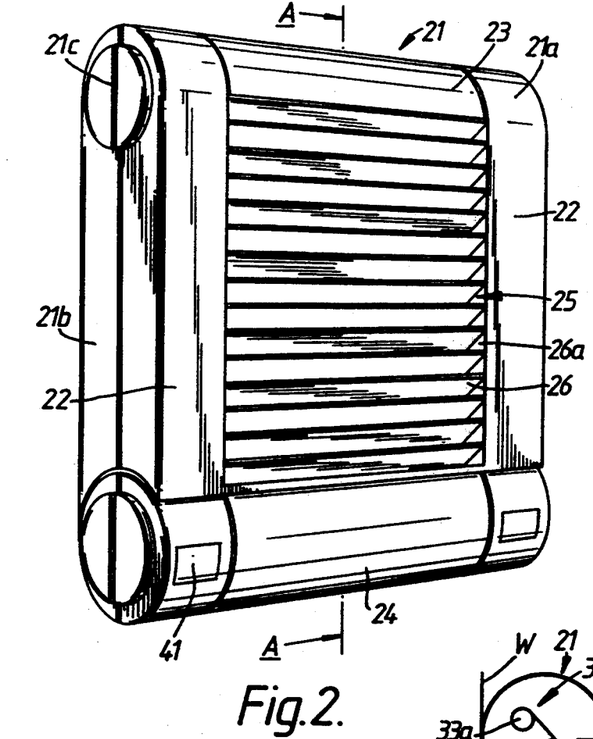
FIG. 2 is an isometric view of the second form of the device.

Referring to FIG. 1 of the drawings, a housing, indicated generally by the reference numeral 1, is mounted on a main support member 2, the housing 1 being symmetrical about the two faces of the member 2, and comprising end covers 3 (the left hand cover having been removed so that the interior of the device can be seen), upper cover 4 and lower cover 5, the covers forming a frame around, and defining, an exposure zone 6 on each side of the device. Ultraviolet strip lamps 7 are mounted within each end cover 3.

An elongate substrate, indicated generally by the reference numeral 8, of a film which has one surface that is adhesive and reflective, extends from upper storage means 9 in the cover 4 to lower storage means 10 in the cover 5, through the exposure zone 6. The portion of the substrate 8 in the exposure zone 6 has its adhesive surface facing outwards and is exposed to, and reflects, radiation from the lamps 7. The upper storage means 9 comprises a shaft 11 on which the unexposed part of the substrate 8 is stored in the form of a roll 8a. The shaft 11 is rotatably mounted at each end in brackets 12 secured to the main support member 2. The lower storage means 10 comprises a shaft 13 mounted on the main support member 2 in a similar manner to the shaft 11. An electric motor 14 is operable to drive the shaft 13 and wind the exposed portion of the substrate 8 into a roll 8b on the shaft, thereby drawing a fresh portion of the substrate from the roll 8a into the exposure zone 6.

On the other side of the device 1, a substrate 15, similar to the substrate 8, is mounted in a similar manner, to move from a roll 15a on its upper shaft 16 to a roll 15b on its lower shaft 17, which is also driven by the electric motor 14 through gears (not shown) causing it to rotate in the opposite sense to the shaft 13.

Attached to supports 18 which extend at intervals along the interior of the lower housing 5 is an elongate knife 19 from which depends a tray unit 20. A similar knife and tray unit (not shown) are arranged on the other side of the device.

In operation, a fresh roll of clean adhesive reflective substrate 8 is mounted on the shaft 11 of the upper storage means 9, and the front portion of the substrate drawn down and secured to the shaft 13. Another fresh roll of substrate 15 is installed in a similar manner on the other side of the device 1. The motor 14 is energized to wind further portions of the substrates 8 and 15 onto their respective shafts 13 and 17, establishing the rolls 8b and 15b. Portions of the substrates 8 and 15 with their adhesive reflective surfaces each facing outwards occupy the exposure zones 6. A control device (not shown), located within the unit or elsewhere, is then activated to energize the lamps 7. Insects attracted by radiation from the lamps 7 reflected by the portions of the substrates 8 and 15 in the exposure zones 6 fly onto the adhesive surfaces of the substrates and adhere to them. The control device can also be used to start the motor 14 at desired intervals for a time sufficient to wind on the substrates 8 and 15 the requisite distance to provide clean surfaces in the exposure zones 6.

Instead of an arrangement in which the upper and lower storage means 9 and 10, respectively, are spaced apart vertically, the two storage means may be arranged adjacent to each other, and the substrate arranged to pass from one to the other over a guide arranged at a location spaced apart from each of the storage means.

Referring to FIGS. 2 to 6, in the second form of the device, a casing, indicated generally by the reference numeral 21 comprises a front portion 21a and a rear portion 21b which are secured together along one side by a hinge 21c so that the front portion 21a can be pivoted away from the rear portion 21b to open the casing. The two portions of the casing 21 together form end covers 22 and upper and lower covers 23 and 24, respectively, similar to the covers of the first form of the device, but in the second form of the device they define only a single exposure zone, which is indicated generally by the reference numeral 25, in the front of the device, the rear portion 21b of the casing being arranged for mounting on a wall w or other support. A louvred panel 26 made from a translucent acrylic plastics material and having openings 26a is removably secured to the front portion 21a of the casing over the exposure zone 25 and forms a window.

Figure 3:
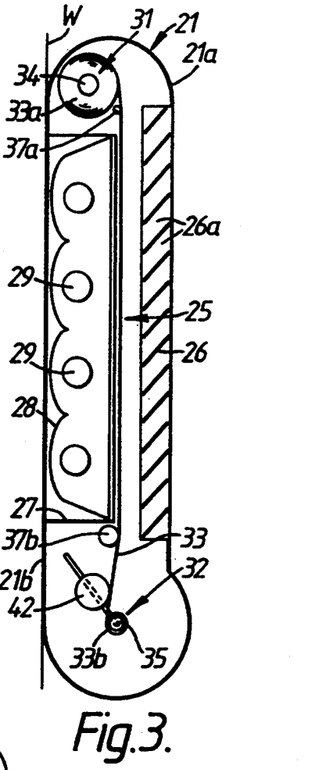
FIG. 3 is a section taken along the line A—A shown in FIG. 2 with some parts of the device removed and showing the substrate in an early stage of use.
Figure 4:
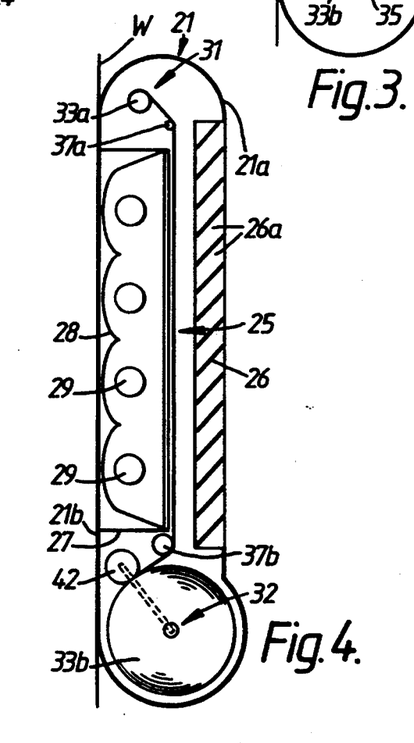
FIG. 4 is a section similar to that of FIG. 3 but showing the substrate at a later stage of use.
Figure 5:
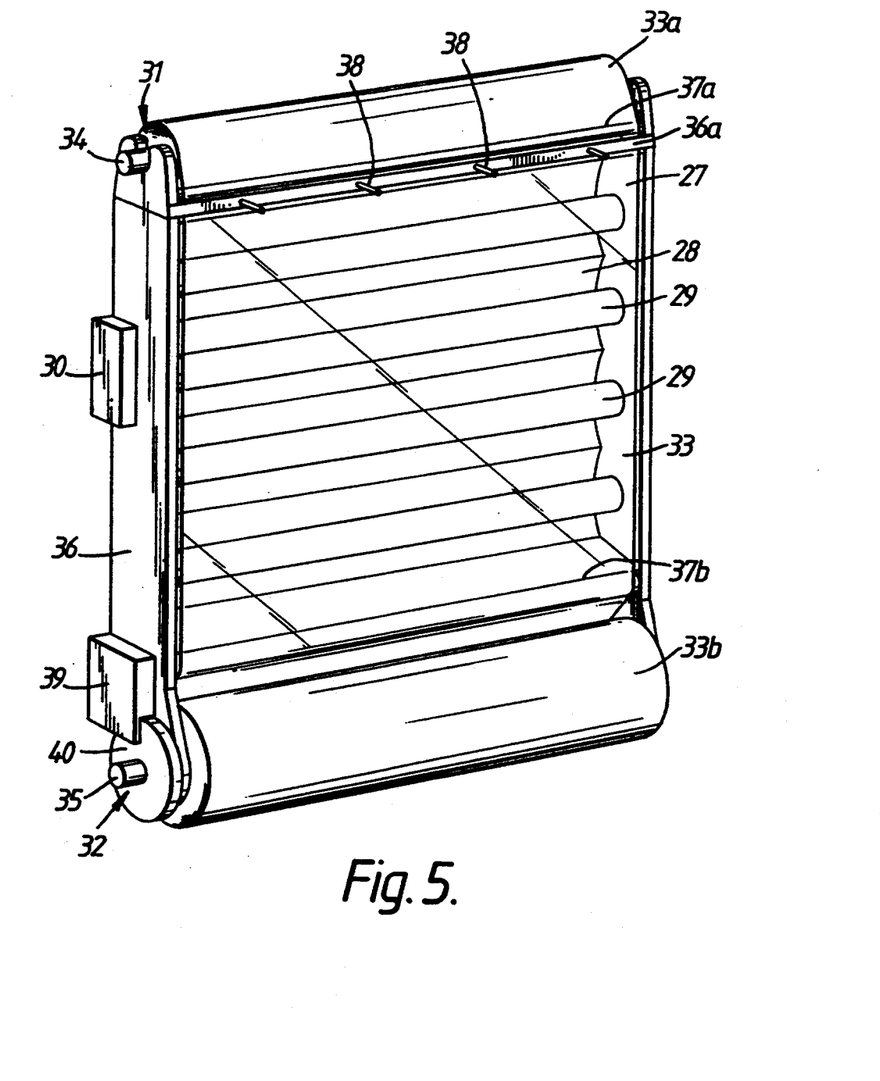
FIG. 5 is a diagrammatic isometric view of the second form of the device with its casing removed.

Within the device, as can be seen in FIGS. 3 to 5, is a lamp box 27 mounted on the rear portion 21b of the casing (the casing not being shown in FIG. 5). The lamp box 27 has a reflective, silvered backing plate 28 and contains a series of ultraviolet strip lamps 29. A transformer 30 for the lamps 29 is also provided. Upper and lower storage means 31 and 32, respectively, are provided for a substrate 33 of transparent film, one surface of which is coated with a transparent adhesive composition and the other surface of which is a release surface. The upper and lower storage means 31 and 32 each comprise a shaft 34 and 35, respectively, rotatably mounted on an inner frame 36. The substrate 33 extends from a supply roll 33a on the shaft 34 to a take-up roll 33b on the shaft 35, passing through the exposure zone 25, with its adhesive surface facing outwards, between the lamps 29 and the louvred panel 26. Upper and lower guide rollers 37a and 37b, respectively, are provided to guide the substrate 33 from the supply roll 33a to the exposure zone 25 and from there to the take-up roll 33b. After passing over the upper guide roller 37a, the substrate 33 passes beneath a strut 36a, which forms part of the inner frame 36. On the strut 36a are mounted a series of pheromone sources 38 having porous filters (not shown) arranged to emit plumes of pheromones into the atmosphere immediately around the substrate 33 in order to attract insects into the exposure zone 25 and onto the substrate 33.

Figure 6:
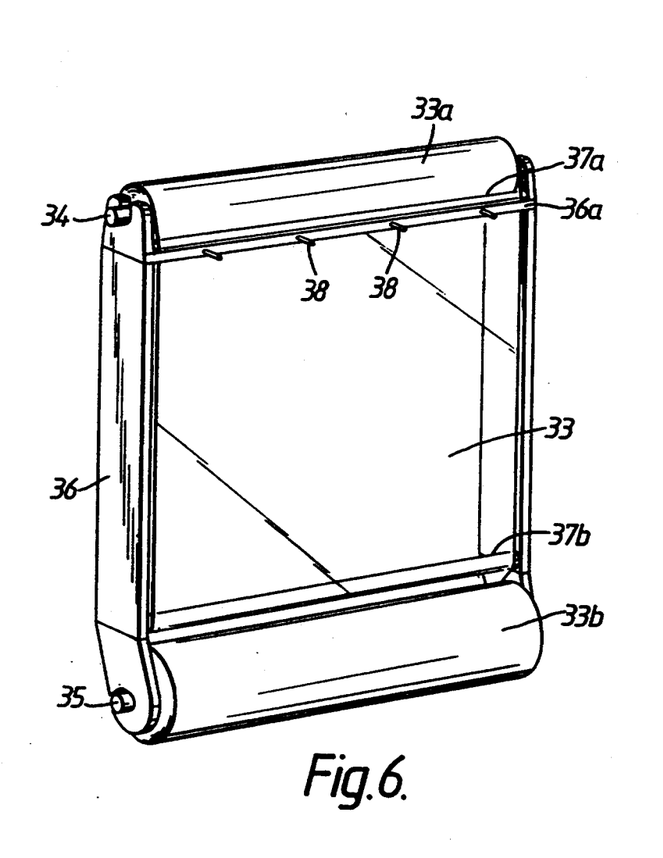
FIG. 6 shows diagrammatically a portion of the device of FIG. 5 on a smaller scale.

The inner frame 36 (together with the strut 36a) is releasably secured to the rear portion 21b of the casing 21 so that together with the shafts 34 and 35, the guide rollers 37a and 37b, and the substrate 33 it can be removed from the remainder of the device. Those removable parts of the device can be regarded as constituting a cassette, which is shown in FIG. 6.

An electric motor 39 (see FIG. 5) is operable to engage the shaft 35 by means of a drive wheel 40 when the cassette is in position to rotate the shaft 35 and advance successive portions of the substrate 33 from the exposure zone 25 onto the roll 33b, at the same time, drawing fresh unused portions of the substrate 33 from the roll 33a into the exposure zone 25. The device is provided with control means (not shown) arranged to activate the motor 39 at predetermined intervals, for example, every five days, for a length of time such that the substrate 33 is advanced sufficiently to present an entirely fresh adhesive surface in the exposure zone 25. The control means is also provided with an override in the form of an infra red sensor 41 (see FIG. 2) which, on receipt of a signal from a remote control device, causes the control means to activate the motor 39 and advance the substrate 33. A spring-loaded crusher bar 42 mounted on the shaft 35 is provided to press against the substrate 33 as it is wound onto the shaft 35 in order to flatten insects onto the substrate. The crusher bar 42 is so mounted that it can move outwards away from the shaft 35 as the size of the roll 33b increases.

FIG. 3 shows the substrate 33 in an early stage of use in which most of the substrate is in the roll 33a and only a small portion is wound onto the shaft 35 into the roll 33b. FIG. 4 shows the substrate 33 at a later stage of use in which only a small portion remains on the shaft 34 in the roll 33a and most of it is in the roll 33b on the shaft 35. It can be seen from FIGS. 3 and 4 that the diameter of the roll 33b when it comprises substantially all the substrate 33 will be significantly greater than the initial diameter of the roll 33a of unused substrate because of the presence of trapped insects on the substrate forming the roll 33b.

In operation, the lamps 29 are energised and ultraviolet light from the lamps and reflected by the backing plate 28 is transmitted through the substrate 33 and the translucent louvred panel 26. Insects, attracted by the ultraviolet light, fly through the openings 26a in the louvred panel 26 and are trapped on the adhesive surface of the substrate 33. Every five days, the motor 39 is energised by the control means and the exposed portion of the substrate 33 is wound onto the roll 33b, the insects trapped on it being crushed and flattened by the crusher bar 42 as the substrate passes beneath it. A fresh portion of the substrate 33 is at the same time drawn down from the roll 33a into the exposure zone 25. If it is desired to advance the substrate 33 more frequently, the override can be operated by a signal from the remote control device. When all the substrate 33 has been used and it is desired to replace it with a fresh substrate, the front portion 21a of the casing is opened and the cassette (shown in FIG. 6) removed. The used substrate 33 can then be exchanged for a fresh one and the cassette replaced in the casing.

Figure 7:
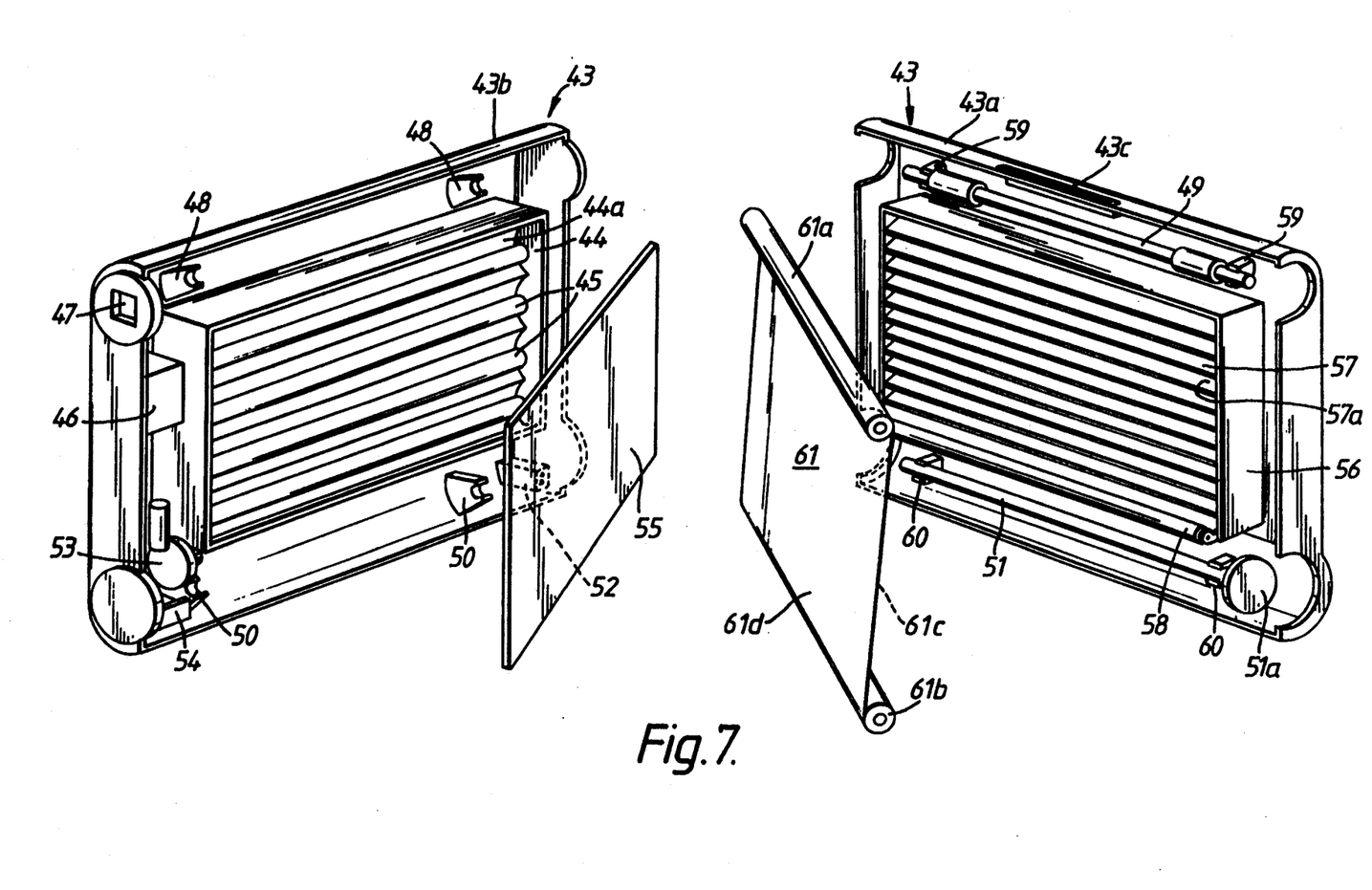
FIG. 7 shows an exploded isometric view of the third form of the device.

Turning now to FIG. 7, in the third form of the device a casing, indicated generally by the reference numeral 43, formed by injection moulding comprises a front portion 43a and a rear portion 43b, respectively, which fasten together by means of series of interlocking projections and mating recess (not shown) formed around their edges, and which can be completely separated from one another as shown in FIG. 7.

The rear portion 43b, which can be secured to a wall or other support, houses a lamp box 44 having a silvered interior including a reflective backing plate 44a arranged to reflect light from a series of ultraviolet strip lamps 45 mounted in the box. The lamps 45 are electrically connected via a transformer 46 to mains power supplied through socket 47 in the rear portion 43b of the casing.

Mounted within the rear portion 43b of the casing above the lamp box 44 are two upper bearing supports 48 for a shaft 49 (which will be described below). Below the lamp box 44 are two lower bearing supports 50 for a shaft 51 (which will also be described below), two warning lamps 52, an electric drive motor 53 with an integral gear box and pinion, and control means 54 comprising a printed circuit board arranged to energise the motor 53 at predetermined intervals, for example, every five days, and also in response to infra red signals from a remote control device (not shown). A sheet 55 of translucent ultraviolet-resistant acrylic material covers the lamp box 44 when the device is assembled.

The front portion 43a of the casing 43, which has a carrying handle 43c, is formed with a frame 56 containing a translucent louvred panel 57 having openings 57a and a silvered inner surface. Above the upper edge of the frame 56 a series of pheromone sources (not shown) similar to the sources 38 of FIG. 5 can be provided. On the lower edge of the frame 56 is mounted an insect crusher roller 58. Like the rear portion 43b, the front portion 43a is also provided with two upper bearing supports 59 and two lower bearing supports 60. Within the upper bearing supports 59 is rotatably mounted the shaft 49 (referred to above) which serves as a support for a supply roll 61a of a substrate 61 of substrate. When the device is assembled, the substrate 61 extends down over the louvred panel 57 and is wound UP into a roll 61b supported on the shaft 51, which is rotatably mounted in the lower bearing supports 59. The substrate 61 is of transparent film with a transparent adhesive composition on the surface 61c nearest to the louvred panel 57 and its other surface 61d being a release surface. The shaft 51 has an integral gear 51a at one end.

When the device is assembled, the front portion 43a of the casing 43 with the substrate 61 extending from the upper roll 61a on the shaft 50 to the lower roll 61b on the shaft 51 is secured to the rear portion 43b of the casing so that the upper bearing supports 48 engage the shaft 49 and the lower bearing supports 50 engage the shaft 51. The integral gear 51a also engages the pinion of the motor 53. The warning lamps 52 are visible through a small window (not shown) in the front portion 43a of the casing, and the portion 43a is also provided with a further small window (not shown) through which infra red signals can be transmitted to the control means.

In operation, the lamps 45 are energised and ultraviolet light from the lamps is transmitted through the substrate 61 and the louvred panel 57. Insects, attracted by the ultraviolet light, fly through the openings 57a in the louvred panel 57 and encounter the adhesive surface of the substrate 61 to which they adhere and are trapped. After the predetermined period of, for example, 5 days, the motor 53 is activated by the control means and rotates the shaft 51 to a degree such that the entire portion of the substrate 61 that was exposed to the ultraviolet radiation is wound onto the shaft 51 and a fresh unexposed portion advanced from the roll 61a into the exposure zone behind the louvred panel 57. Immediately before the substrate 61 is wound onto the roll 61b it passes around the crusher bar 58, which flattens onto the roll the insects adhering to the substrate. If a fresh portion of the substrate 61 is required in the exposure zone sooner than at the end of the predetermined period, an infra red override signal can be sent to the control means to cause the motor 53 to be activated.

When all the substrate 61 has been used, and/or it is desired to replace it, the front portion 43a of the casing with the substrate 61 and the shafts 49 and 51 (which together constitute a cassette) can be removed from the rear portion 43b of the casing, which remains in situ. The used substrate 61 can then be removed, and a fresh substrate installed. The cassette can then be replaced.

Instead of merely replacing the substrate 61 in the front portion 43a, an entirely new cassette may be substituted for the original one.

I claim:

1. A device for trapping flying insects, which device comprises a substrate, first and second storage means for the substrate, a radiation source, and an exposure zone in which radiation emitted from the source is incident upon a portion of the substrate, the first storage means being arranged to store a supply of the substrate from which successive portions can be advanced to the exposure zone, the second storage means being arranged to store successive portions of the substrate withdrawn from the exposure zone, and the arrangement being such that radiation emitted from the source is reflected from the portion of the substrate in the exposure zone, or is transmitted through that portion, so as to attract insects onto, that portion, and at least a part of the surface area of that portion is adhesive so that insects attracted by the radiation adhere thereto, and wherein the device also comprises advancing means for drawing successive portions of the substrate from the first storage means to the exposure zone and withdrawing successive portions from the exposure zone to the second storage means, and control means arranged to so operate the advancing means that the substrate is advanced intermittently to an extent sufficient for a fresh portion of the substrate to occupy the exposure zone.

2. A device as claimed in claim 1, wherein the control means includes an override to enable a user to advance the substrate.

3. A device as claimed in claim 2, wherein the override is operable by remote control.

4. A device as claimed in claim 1, wherein the first and second storage means and the substrate are formed as a cassette, which is removable from the remainder of the device.

5. A device as claimed in claim 1, wherein the device is provided with a translucent or transparent window arranged to transmit radiation from the source and having one or more openings through which insects can pass, the window being arranged adjacent to the portion of the substrate in the exposure zone.

6. A device as claimed in claim 5, wherein the window is in the form of a louvred panel.

7. A device as claimed in claim 6, wherein the device comprises a cassette, and the louvred panel forms part of the cassette.

8. A device as claimed in claim 1, wherein the substrate is in the form of a reflecting film or foil, at least the portion of which in the exposure zone has an adhesive surface, and the source of radiation and the substrate are so arranged that the said adhesive surface of the portion of the substrate in the exposure zone reflects radiation from the source.

9. A device as claimed in claim 8, wherein the substrate is a thermoplastics or paper film having a metallized surface.

10. A device as claimed in claim 1, wherein the substrate is in the form of a transparent film, at least the portion of which in the exposure zone has, on one surface, a transparent adhesive composition, and the source of radiation and the substrate are so arranged that the said portion of the substrate transmits radiation from the source.

11. A device as claimed in claim 1, wherein the radiation source comprises one or more sources of ultraviolet radiation.

12. A device as claimed in claim 1, wherein the substrate is in the form of film or foil and one surface of the substrate is adhesive substantially throughout its length.

13. A device as claimed in claim 12, wherein the other surface of the substrate is a release surface.

14. A device as claimed in claim 1, wherein the adhesive comprises poly-butenes.

15. A device as claimed in claim 1, wherein there is provided means for crushing insects adhering to the substrate so as to flatten them onto the substrate.

16. A device as claimed in claim 1, wherein the device comprises means for applying pheromones to the adhesive surface of the substrate or means for emitting pheromones into the atmosphere immediately surrounding the substrate.

17. A device as claimed in claim 16, which comprises a cassette and wherein one or more sources of pheromones are mounted in the cassette so as to be removable therewith.

* * * * *

UNITED STATES PATENT AND TRADEMARK OFFICE
CERTIFICATE OF CORRECTION

PATENT NO. : 5,425,197
DATED : June 20, 1995
INVENTOR(S) : Colin Peter Smith

It is certified that error appears in the above-identified patent and that said Letters Patent is hereby corrected as shown below:

Cover page, change the publication date of the PCT application from "Nov. 6, 1992" to --Nov. 26, 1992--.

Signed and Sealed this

Fourteenth Day of November, 1995

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,425,197
DATED : June 20, 1995
INVENTOR(S) : Colin Peter Smith

It is certified that error appears in the above-indentified patent and that said Letters Patent is hereby corrected as shown below:

Title page, change the country for the four Foreign Patent Documents indicated as "Denmark" to --Germany-- so that the list of Foreign Patent Documents reads as follows:

FOREIGN PATENT DOCUMENTS

```
 530908   4/1980  Australia
2610191   9/1977  Germany
3511215  10/1986  Germany
3810065   4/1989  Germany
3840440  10/1989  Germany
0213369   3/1987  European Pat. Off.
0369976   5/1990  European Pat. Off.
8704469 U 9/1987  Germany
 161335   6/1991  Taiwan. Prov. of China
 503943   7/1937  United Kingdom
1303109   4/1987  U.S.S.R.
```

Signed and Sealed this

Thirtieth Day of July, 1996

Attest:

BRUCE LEHMAN

*Attesting Officer*  *Commissioner of Patents and Trademarks*